(12) United States Patent
Berg

(10) Patent No.: US 8,494,561 B2
(45) Date of Patent: Jul. 23, 2013

(54) RADIO NETWORK LIST FOR VEHICLE CONTROL AND REAL TIME POSITION DATA

(75) Inventor: Ulf Berg, Stockholm (SE)

(73) Assignee: Trimble AB, Danderyd (SE)

(*) Notice: Subject to any disclaimer, the term of this patent is extended or adjusted under 35 U.S.C. 154(b) by 378 days.

(21) Appl. No.: 12/451,123

(22) PCT Filed: May 30, 2007

(86) PCT No.: PCT/EP2007/004770
§ 371 (c)(1),
(2), (4) Date: Oct. 27, 2009

(87) PCT Pub. No.: WO2008/145157
PCT Pub. Date: Dec. 4, 2008

(65) Prior Publication Data
US 2010/0103981 A1    Apr. 29, 2010

(51) Int. Cl.
*H04W 24/00* (2009.01)
*H04W 36/00* (2009.01)

(52) U.S. Cl.
USPC ............................ 455/456.3; 455/436

(58) Field of Classification Search
USPC .......................... 455/456.1–456.6
See application file for complete search history.

(56) References Cited

U.S. PATENT DOCUMENTS

| 5,430,759 A | 7/1995 | Yokev et al. |
| 6,189,626 B1 | 2/2001 | Hanseder |
| 2006/0023203 A1 | 2/2006 | Gatsios et al. |
| 2006/0121884 A1* | 6/2006 | Chana et al. .................. 455/411 |
| 2007/0019212 A1* | 1/2007 | Gatsios et al. ................ 356/614 |

FOREIGN PATENT DOCUMENTS

| EP | 0 583 523 | 2/1994 |
| WO | WO 94/01812 | * 1/1994 |
| WO | WO 2004/057269 | 7/2004 |

OTHER PUBLICATIONS

International Search Report.

* cited by examiner

*Primary Examiner* — Michael Faragalla
(74) *Attorney, Agent, or Firm* — Harness, Dickey & Pierce, P.L.C.

(57) ABSTRACT

One embodiment of the present invention relates to systems and methods for providing vehicles including construction machines and work vessels at a work site including construction work sites and naval work sites with real time position data from survey units located at the construction work site. In particular, a method according to the present invention includes the steps of accessing a network list identifying vehicles within the site; identifying, by using the network list, a vehicle requiring position data; and initiating a radio communication session with an identified vehicle during which the vehicle is provided with real time position data.

31 Claims, 4 Drawing Sheets

RADIO NETWORK LIST FOR VEHICLE CONTROL AND REAL TIME POSITION DATA

FIELD OF THE INVENTION

The present invention relates generally to systems and methods for determining the position of a vehicle such as work machine or vessel with a position-determining apparatus, such as a survey unit. The present invention concerns particularly systems and methods for providing vehicles such as work machines or vessels at a work site with real time position data from survey units located at the work site.

BACKGROUND

In many work site applications of today, high-precision position of work machines, work vehicles, vessels, or work platforms is required, for example, at a marine or naval work site where a number of marine or naval work vessels and/or marine or naval work platforms perform work task at maintenance work of a submarine pipeline or submarine cable, or at a construction work site where earthmoving construction machines such as graders and dozers performs work task to construct a road. For example, in the civil engineering and construction industry of today more and more applications require high-precision position for earthmoving construction machines such as graders and dozers. Survey units or total stations are located on a work site for, inter alia, automatically tracking such construction machines by measuring a distance to the machine and providing the machine with positioning data. Such total station are, for example, described in WO 2004/057269 by the same applicant.

The surveying unit is based on optical surveying allowing the unit to follow a machine and also includes a built-in RF transceiver which provides two-way communication with the machines and a controlling computer thereby enabling the unit to provide a machine with, for example, position data.

During, for example, a road construction, it is important that the construction machines continuously are provided with accurate positioning data in order to give a predetermined topography to a specific place of ground. The desired topography for each position of the construction work site is written into a computer program stored in, for example, the controlling computer and may be provided to the machines in advance or continuously and automatically together with its position at the work site.

In general, several machines and several geodetic instruments or survey units are located on a work site and each machine communicates with one or several survey units, for example, by using a frequency hopping spread spectrum technology operated in the 2.4 GHz ISM band. In order to provide a reliable and accurate coverage of a complete work site, a large number of survey units are required to provide reliable and accurate machine control at the work site. The machines often move over different areas of the site, which only some of the units may access due to, for example, range limitations. In order to be able of continuously download position data, a machine may have to switch between different survey units during the operation. A survey unit that has been set in an idle mode by a machine normally starts looking after a new machine to communicate with. In a frequency hopping technique system each machine communicates with at least one station over a radio channel and a large number of radio channels may thus be used. Thereby, a survey unit may have to, in order to establish and initiate a communication session with a machine, search through all channels and it takes 5-10 seconds to gain lock to one hopping pattern. Thus, in case of 64 channels it may require 5-10 minutes to scan through all 64 channels.

Hence, there is a need of an improved and more efficient method for providing work vehicles, such as construction machines, work vessels, or work platforms, at a work site, such as a marine or naval work site, a construction work site, a building work site, a housing site or a mining work site, with real time position data from survey units or total stations located at the work site.

SUMMARY OF THE PRESENT INVENTION

Thus, an object of the present invention is to provide an improved and more efficient method, a system, and a total station for supplying work machines, such as construction machines, work vessels, or work platforms, at a work site, naval work site, a construction work site or a mining work site, such as with real time position data from survey units or total stations located at the work site.

Another object of the present invention is to provide a method, a system and a total station for minimizing the number of total stations required on a such a work site for reliable machine, platform or vessel control.

A further object of the present invention is to provide a method, a system and a total station for minimizing idle times for such total stations.

These and other objects of the present invention are achieved by means of methods, a system, a total station, and a computer program product having the features defined in the independent claims. Preferable embodiments of the invention are characterized by the dependent claims.

In order to clarify, the term "total station" used herein refers to a distance measuring instrument with an integrated distance and angular measurement, i.e. with combined electronic, optical and computer techniques. Such an instrument gives both the distance as well as the vertical and horizontal direction towards a target, whereby the distance is measured against a reflector. The term "total station" as used herein includes the following terms: survey unit, or geodetic instrument.

According to an aspect of the present invention, there is provided a method for communication between a vehicle and at least one total station at a work site, each including a radio communication unit and a control unit, the total station further comprising position calculating means adapted to calculate position data including at least horizontal and vertical angle and distance between the total station and at least one target arranged at the vehicle and the total station being adapted to send the position data to the vehicle during a radio communication session. The method comprises the steps of: accessing a network list comprising information identifying vehicles within the site; identifying a vehicle requiring position data using the network list; and initiating a radio communication session with an identified vehicle during which the vehicle is provided with real time position data.

According to a second aspect of the present invention, there is provided a system comprising at least one total station at a work site, including a radio communication unit and a control unit, and at least one and target adapted to be arranged on a vehicle. The total station further comprises position calculating means adapted to calculate position data including at least horizontal and vertical angle and distance between the total station and the at least one target arranged at the vehicle and the total station being adapted to send the position data to the vehicle during a radio communication session. The control circuit of the total station is adapted to: access a network list comprising information identifying vehicles within the site; identify a vehicle requiring position data using the network list; and initiate a radio communication session with an identified vehicle during which the vehicle is provided with real time position data using the communication unit of the total station.

According to a third aspect of the present invention, there is provided a total station for use at a work site including a radio communication unit and a control unit. The total station further includes position calculating means adapted to calculate position data including at least horizontal and vertical angle and distance between the total station and at least one target arranged at a vehicle and the total station is adapted to send the position data to the vehicle during a radio communication session, the control circuit of the total station being adapted to: access a network list identifying vehicles within the site; identify a vehicle requiring position data using the network list; and initiate a radio communication session with an identified vehicle during which the vehicle is provided with real time position data using the communication unit of the total station.

According to a further aspect of the present invention, there is provided a computer program product, directly loadable into an internal memory of a total station according to the third aspect of the present invention, comprising software code portions for causing a control unit of the total station to perform steps in accordance with the first aspect of the present invention.

The present invention is based on the idea of gathering information, e.g. the radio channels used by the vehicles, related only to vehicles, such as construction machines, work vessels for performing naval or marine works tasks including placing of or maintenance work of submarine cables or pipelines or work platforms for marine or naval applications or construction work applications, at a work site, such as a construction site, a naval work site or a mining work site, requiring position data in network lists, wherein the network list can be accessed by total stations located at the work site. Each total station can have access to an individual network list and the network lists may be the same for different total station or may be different for different total stations. A total station is able to, by accessing such a network list, identify a vehicle requiring position information, without having to scan through all the radio channels used in the communication system but only the channels appearing in the list. Thus, the procedure of identifying and connecting to a vehicle that needs real time position data can be speeded up significantly and the idle time for a total station can be reduced. Furthermore, the number of total stations required at a work site can also be reduced since the idle times of the total stations can be reduced.

In one embodiment of the present invention 64 radio channels are used, and according to conventional technology, a total station or total station may have to, in order to establish a communication link and initiate a communication session with a vehicle at the work site, search through all 64 channels, and it requires about 5-10 seconds to gain lock to one hopping pattern and thus it may require 5-10 minutes to scan through all 64 channels. However, according to the present invention, a network list containing only the radio channels used by vehicles within a communication range of a total station may be located in the total station, for example, stored in a memory circuit of the station. Thereby, a total station being in an idle mode is capable of identifying a vehicle requiring position data by searching through the network list, which may contain e.g. five or eight radio channels. In this case, if all channels in the list have to be scanned, it might require about 1 minute to identify a vehicle, establish and initiate a communication session with a vehicle in order to provide it with real-time position data, which is a significant improvement in comparison to the prior art.

In one embodiment of the present invention, information related to vehicles being in a communication range of a total station is gathered in the network list of that particular total station.

The network list of a total station can be updated, e.g. adding or deleting a vehicle from the list, by accessing a central control station or address server or by a vehicle distributing an updated list to the total station.

According to an embodiment of the present invention, a total station being in an idle mode is adapted to scan through the list. This can be made from top to bottom of list, where the vehicles are sorted for example by identity or by radio channel, or in accordance with a priority order, where a certain vehicle performing certain tasks at the work site may have a higher priority than another vehicle performing other tasks. The total station may send inquiry signals to an identified vehicle including an inquiry whether the vehicle requires position data and when a response message including a verification that the vehicle is interested of requiring position information is received, the communication session is initiated and the vehicle is provided with real time position data.

In one embodiment, the network list is located in storage unit of a central control station, which the total station of the work site may access via a communication link, which may be wireless.

In accordance with an embodiment of the present invention, the total station may access the network list when the total station receives an idle message informing the total station that a communication session between a vehicle and the total station has been terminated and the communication link has been lost.

In a further embodiment, the total station may access the network list if the total station has lost the connection with a vehicle in a communication session during a predetermined period of time.

In accordance with embodiments of the present invention, a vehicle communicates with several total stations over the same radio channel and is provided with real time position data from several total stations. Thereby, for example, a higher degree of accuracy can be achieved or several points at the vehicle can be measured in order to keep track of, for example, a gradient or inclination of the vehicle.

In another embodiment, a service vehicle, for example, an ATV ("All Terrain Vehicle") four-wheel motorcycle is used to control whether a task performed by a vehicle was correctly performed. The service vehicle may be equipped with a RF communication unit and a target and can thus communicate with total stations at the work site and/or the control station.

According to embodiments, the present invention is implemented at a naval work site where a number of work vessels and/or work platforms perform work tasks such as maintenance work of or at a placing of a submarine pipeline or submarine cable, or at a mining site such as a open-cast or open cut mine or at an underground mining work site.

As realized by the person skilled in the art, steps of the methods of the present invention, as well as preferred embodiments thereof, are suitable to realize as a computer program or a computer readable medium.

The features that characterize the invention, both as to organization and to method of operation, together with further objects and advantages thereof, will be better understood from the following description used in conjunction with the accompanying drawings. It is to be expressly understood that the drawings is for the purpose of illustration and description and is not intended as a definition of the limits of the invention. These and other objects attained, and advantages offered, by the present invention will become more fully apparent as the description that now follows is read in conjunction with the accompanying drawings.

BRIEF DESCRIPTION OF THE DRAWINGS

In the following detailed description, reference will be made to the accompanying drawings, of which.

DETAILED DESCRIPTION OF THE PRESENT INVENTION

Figure 1:
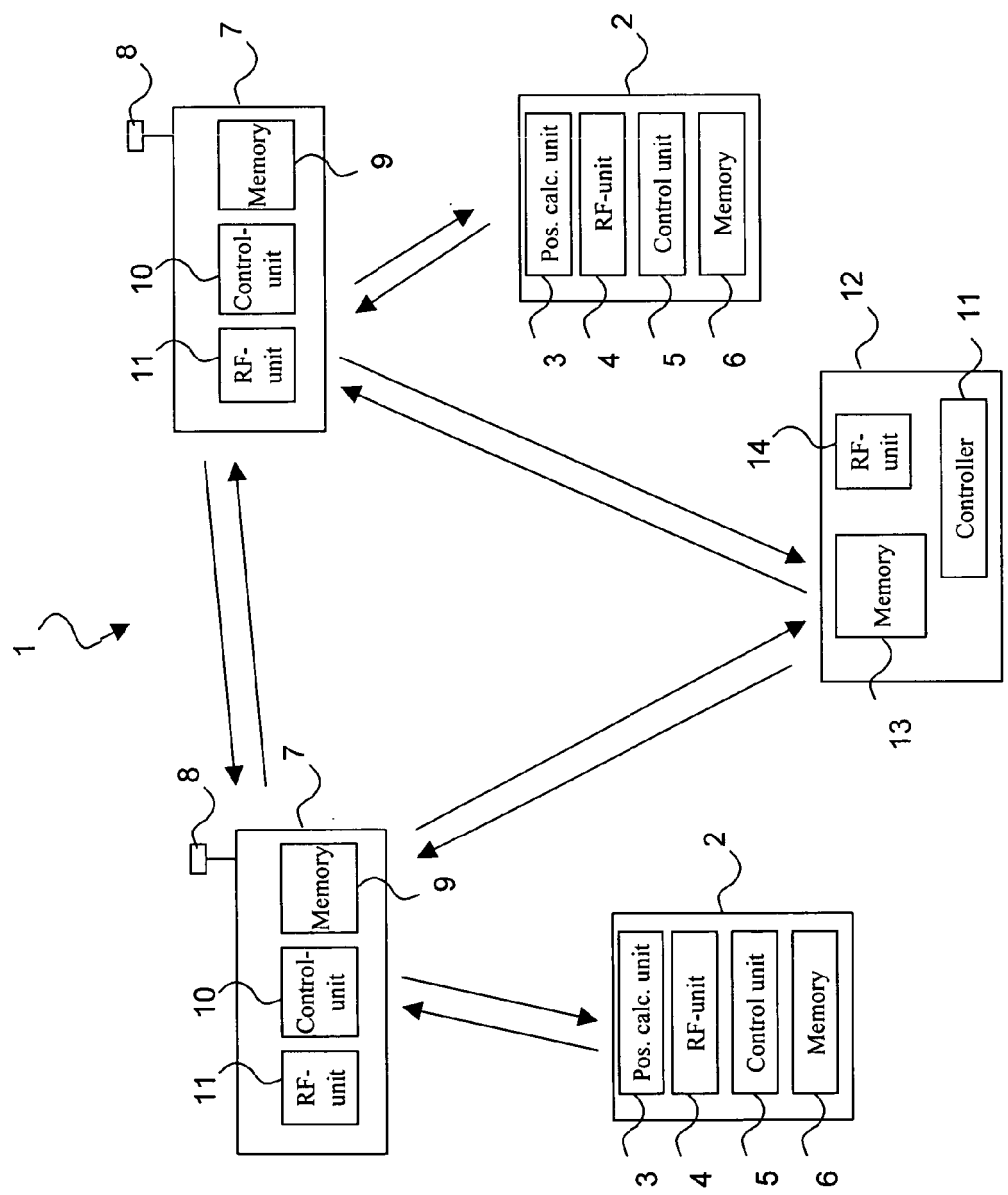
FIG. 1 schematically shows a system in accordance with an embodiment of the present invention.

The frequency hopping spread spectrum technology used in the present invention is in one embodiment operated in the 2.4 GHz ISM band, which allows license-free use and worldwide compliance.

Spread spectrum provides for a high resistance to noise and multipath fading and robustness in the presence of interfering signals. The radio transmission channel is normally corrupted by noise, path loss and interfering transmissions from other radios. In particular, radio performance faces serious degradation through multipath fading, which is the result from when two or more reflected rays of the transmitted signal arrive at the receiving antenna with opposing phases thereby partially or completely cancelling the desired signal. In the frequency domain, a multipath fade can be described as frequency-selective notch that shifts in location and intensity over time as reflections change due to motion of the radio or objects within its range. At any given time, multipath fades will typically occupy 1%-2% of the 2.4 GHz band. Spread spectrum reduces the vulnerability of a radio system to interference from both jammers and multipath fading by distributing the transmitted signal over a larger region of the frequency band. This allows the signal to be reconstructed even though part of it may be lost or corrupted in transit.

In a spread spectrum frequency hopping system, the carrier frequency is varied rapidly according to a pseudo-random pattern over a broad range of channels. That is, a transmitting radio unit periodically changes the frequency at which it transmit. In order for receiving radio units in the network to receive the transmission, they must listen at the frequency over which the current transmission is sent. Thus, all radio units must be synchronized and must be set to the same hopping pattern.

In point-to-point or point-to-multipoint systems, one radio unit is designated as the base station and the other radio units are designated as remotes. In the system according to the present invention, each work vehicle is designated as base station and the total stations function as remotes. Upon an initiation of a communication session, the base station transmits a synchronization signal to the remotes to allow them to synchronize with the base station. When the remotes know the hopping pattern, i.e. when having received the synchronization signal, they know which frequency to use and when to hop. Every time the base station hops to a different frequency, it immediately transmits a synchronization signal.

When a remote unit, i.e. a total station, has synchronized with a base, it request registration from the base station, i.e. a vehicle. The registration process identifies to the base station the remote units from which transmissions will be received.

At the beginning of each hop, the base station transmits a synchronization signal. The amount of data the base station can transmit per hop is determined by the base slot size parameter. The amount of data a remote unit can send in one hop depends on the hop duration, the base slot size and the number of remotes communicating with the base station. The maximum data length per hop is 212 bytes, which may be limited by hop duration, the base slot size and the number remotes communicating with the base station.

In one embodiment of the present invention a point-to-multipoint configuration is used. In such a configuration a star topology is used with a vehicle set up as base station acting as a central communication point and at least one total station in the network set up as remote units.

With reference first to FIG. 1, a system environment, e.g. a construction site, in which the system and method in accordance with the present invention can be implemented will be discussed. At a work site 1, which in this example is a construction work site, a plurality of work vehicles 7, for example, construction work machines including earthmoving construction machines such as graders and dozers or work platforms are performing different working tasks such as road construction or levelling of ground in accordance with a predetermined scheme. Each vehicle 7 is, during operation, provided with real time position data from at least one geodetic instrument or total station 2 set up within the construction site 1 of a plurality of such instruments 2. The instrument 2 is, for example, a distance measuring instrument with an integrated distance and angular measurement of the type which is called a total station, i.e. with combined electronic, optical and computer techniques. Such a geodetic instrument gives both the distance as well as the vertical and horizontal direction towards a target, whereby the distance is measured against a reflector, e.g. of the corner cube type. A total station is furthermore provided with a computer or control unit with writable information for measurements to be performed and for storing data obtained during the measurements.

Preferably, unmanned total stations are used for the present invention, which means that a total station automatically searches and locks onto and follows an intended target. Preferably, the total station calculates the position of a target in a fixed ground-based coordinate system. In, for example, WO 2004/057269 by the same applicant, such a total station is described in more detail.

A vehicle 7, e.g. a motor grader or bulldozer or work vessel, is provided with at least one target or reflector unit 8 such as a corner cube prism arranged on the vehicle 7, for example, on the roof of the vehicle. A corner cube prism reflects back an incident beam in the opposite direction even if the angle of incidence is relatively oblique.

The total station 2 can give absolute determination of the position of the target 8 in the fixed coordinate system continuously or at short time intervals. The position data includes as discussed above, inter alia, distance between the vehicle 7 and the total station 2, vertical and horizontal angles between the vehicle 7 and the total station 2.

The total station 2 includes a control unit 5 and a position calculation circuit 3 including, inter alia, a tracker unit (not shown) which detects the target 8 of a vehicle, and an RF-unit 4, e.g. a telemetry radio unit, which provides low-latency, two-way communication with a RF-unit 11 of a vehicle 7.

Moreover, the total station 2 comprises a memory circuit 6, which memory circuit 6 may include a random access memory (RAM) and/or a non-volatile memory such as a read-only memory (ROM).

In the present invention, as discussed above, a frequency hopping technique is used for the communication between the plurality of vehicles 7 and total stations 2 of the construction work site 1. Each vehicle 7 communicates with at least one total station 2 over a radio channel and in one embodiment of the present invention 64 channels are used.

According to conventional technology, a total station 2 may have to, in order to establish a communication link and initiate a communication session with a vehicle 7, search through all 64 channels and it takes 5-10 seconds to gain lock to one hopping pattern and thus it may require 5-10 minutes to scan through all 64 channels.

However, according to an embodiment of the present invention, a network list containing only the radio channels used by vehicles within a communication range of a total station 2 may be located in the total station 2, for example, stored in the memory circuit 6. Thereby, a total station 2 being in an idle mode is capable of identifying a vehicle requiring position data by searching through the network list, which may contain e.g. five or eight radio channels. In this case, if all channels in the list have to be scanned, it might require about 1 minute to identify a vehicle, establish and initiate a communication session with a vehicle 7 in order to provide it with real-time position data, which is a significant improvement in comparison to the prior art.

Further, as shown in FIG. 1, the system comprises a control station 12, for example, a control computer including controller 11, which may include a microprocessor, a memory unit 13, which may be a data base, and a communication unit 14, e.g. RF-unit such as a telemetry radio unit, which provides low-latency, two-way communication with a RF-unit 11 of a vehicle 7. The memory unit 13 may comprises a site map containing, for example, instructions of each task to be performed by each vehicle, the operating ranges of each vehicle, and the positions of the different total stations 2. Thereby, an operator establishing a total station at the construction site, i.e. placing a total station at the site and preparing it for operation, may connect to the control station 13 by means of a communication device, for example, a laptop having a communication unit in order to download the exact intended position of the total station. Furthermore, a vehicle may connect to the control station to download, for example, instructions of the task to be performed by the vehicle at the construction site and where to perform the tasks. The vehicles 7 of the construction site and the control station 12 may be interconnected to each other in a communication network, for example, in a network forming a part of a wireless LAN ("Local Area Network"). For a given communication method, a multitude of standard and/or proprietary communication protocols may be used. For example, and without limitation, wireless (e.g. radio frequency pulse coding, spread spectrum frequency hopping, time-hopping, etc.) and other communication protocols (e.g. SMTP, FTP, TCP/IP) may be used. Other proprietary methods and protocols may also be used. Furthermore, combination of two or more of the communication methods and protocols may also be used. According to embodiments of the present invention, spread spectrum frequency hopping is used for the communication.

A vehicle 7, for example, entering a communication range of one or more total station 2 and in need of position data may send out an inquiry signal, e.g. by means of broadcast, to the total station or total stations 2 thereby informing them that the particular vehicle 7 should be in the network list. In another embodiment, the vehicle 7, for example, entering a communication range of one or more total station 7 and in need of position data may send out an inquiry signal to a central station, see below, informing it that the vehicle 7 should be included in the network list (-s) of the total station (-s) of the communication range. The network list (-s) of the total station (-s) 2 may then be updated via the vehicle 7.

In accordance with embodiments of the present invention, a vehicle 7 communicates with several total stations 2 over the same radio channel and is provided with real time position data from several total stations 2. Thereby, for example, a higher degree of accuracy can be achieved or several points at the vehicle 7 can be measured to keep track of a gradient or inclination of the vehicle 7.

In a further embodiment, a service vehicle, for example, an ATV ("All Terrain Vehicle") four-wheel motorcycle is used to control a task performed by a vehicle 7 was correctly performed. The service vehicle may be equipped with a RF communication unit and a target and can thus communicate with total stations 2 at the work site 1 and/or the control station 12.

As the skilled person realizes, the present invention can also be implemented or used in other applications, for example, at a marine or naval work site where a number of marine or naval work vessels and/or work platforms perform work task such as maintenance work of or placing of a submarine pipeline or a submarine cable, or at a mining site such as a open-cast or open cut mine or at an underground mining work site.

Figure 2:
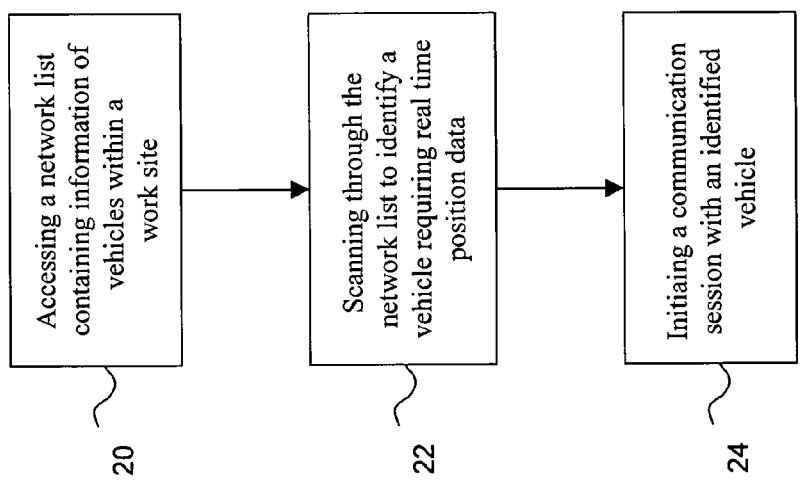
FIG. 2 is a high-level flow chart of the method for providing vehicles at a work site with real time position data from survey units or total stations located at the work site in accordance with the present invention.

With reference now to FIG. 2, a high-level description of a method for communication between a construction vehicle and a total station at a work site as described with reference to FIG. 1 according to the present invention will be discussed. According to the method, the vehicle is, during a radio communication session, provided with real time position data, wherein the position data includes at least the horizontal and vertical angle and distance between the total station and the vehicle.

First, at step 20, a total station 2 being in an idle mode accesses a network list containing information regarding a number of vehicles 7 within a operating or communicating range of the total station in order to identify a vehicle. According to the invention, a total station 2 will access the network list when the station 2 has entered an idle mode, for example, after it has been in an idle mode during a predetermined period of time. This can be case when, for example, a certain vehicle does not need position information from a certain total station and therefore instructs the total station to go idle or when a certain total station looses the connection with the vehicle, e.g. due to that the vehicle moves out of the communication range of the total station, and the connection is not resumed within a predetermined period of time. Thus, the vehicles in a list may vary over time due to, for example, that the vehicles may move over different areas of the work site and may therefore move in and out of the operating range of a particular total station.

Then, at step 22, a search or scan is performed in the network list to find a vehicle 7 requiring position data. This can be made from top to bottom of list, where the vehicles 7 are sorted, for example, by identity or by radio channel, or in accordance with a priority order, where a certain vehicle 7 performing certain tasks at the work site 1 may have a higher priority than another vehicles 7 performing other tasks. The total station 2 may send inquiry signals to an identified vehicle 7 including an inquiry whether the vehicle 7 requires position data and when a response message including a verification that the vehicle 7 is interested of requiring position information is received, the communication session is initiated and the vehicle 7 is provided with real time position data.

Thereafter, at step 24, a radio communication session is initiated with a responding vehicle 7 during which the vehicle 7 is provided with real time position data. The communication session will proceed, for example, either until the vehicle 7 does not need the total station 2 and the total station 2 is instructed to go idle and access the network list in order to identify a new vehicle 7 or until the communication session is interrupted during a predetermined period of time.

According to the present invention, a network list containing only the radio channels used by vehicles within a communication range of a total station may be located in the total station, for example, stored in a memory circuit of the station. Thereby, a total station being in an idle mode is capable of identifying a vehicle requiring position data by searching through the network list, which may contain e.g. five or eight radio channels. In this case, if all channels in the list have to be scanned, it might require about 1 minute to identify a vehicle, establish and initiate a communication session with a vehicle 7 in order to provide it with real-time position data, which is a significant improvement in comparison to the prior art.

Figure 3:
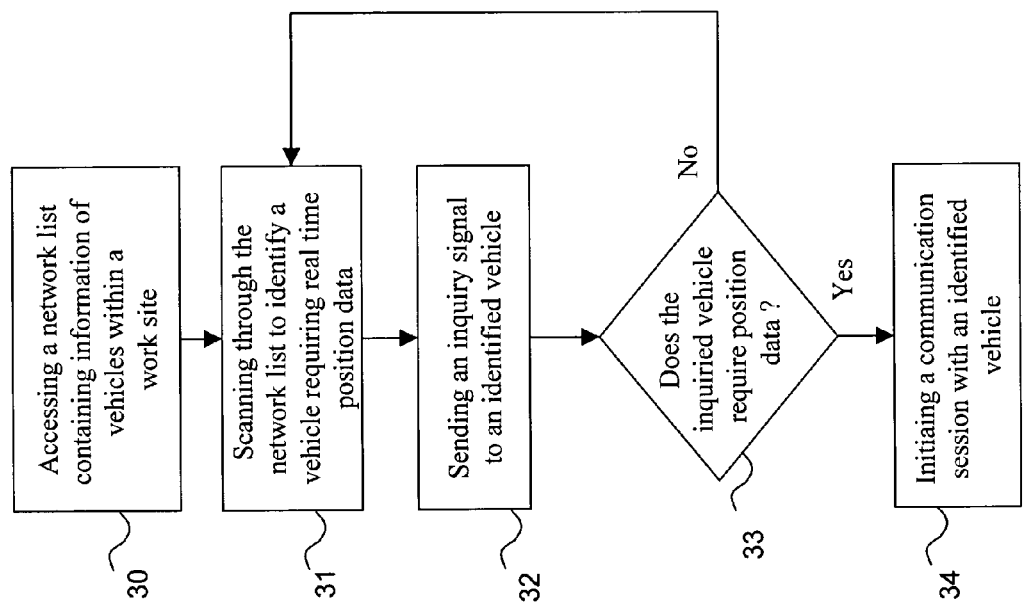
FIG. 3 is flow chart of an embodiment of the method according to the present invention.

Referring now to FIG. 3, an embodiment of the method according to the present invention will be discussed. First, in step 30, a total station 2 being in an idle mode accesses a network list containing information regarding a number of vehicles 7 within a operating or communicating range of the total station 2 in order to identify a vehicle 7. The total station 2 may access the network list when the total station 2 receives an idle message informing the total station 2 that a communication session between a vehicle 7 and the total station 2 has been terminated and/or when a communication link between the total station 2 and the vehicle 7 has been lost.

Thereafter, at step 31, a search or scan is performed in the network list to find a vehicle 7 requiring position data. Then, at step 32, an inquiry signal is sent to a first identified vehicle 7 of the network list. As discussed above, there are different procedures for scanning the network list. The inquiry signal comprises an inquiry whether the identified vehicle 7 requires position information. At step 33, it is checked whether a received response signal includes a verification that the particular vehicle 7 requires position data. If yes, the algorithm proceeds to step 34 where the total station 2 starts tracking the vehicle 7 and a radio communication session with the vehicle 7 is initiated during which the vehicle is provided with real time position data. On the other hand, if no, the algorithm returns to step 31, where the search in the network list is continued and an inquiry signal is sent to the next identified vehicle 7 of the network list.

Figure 4:
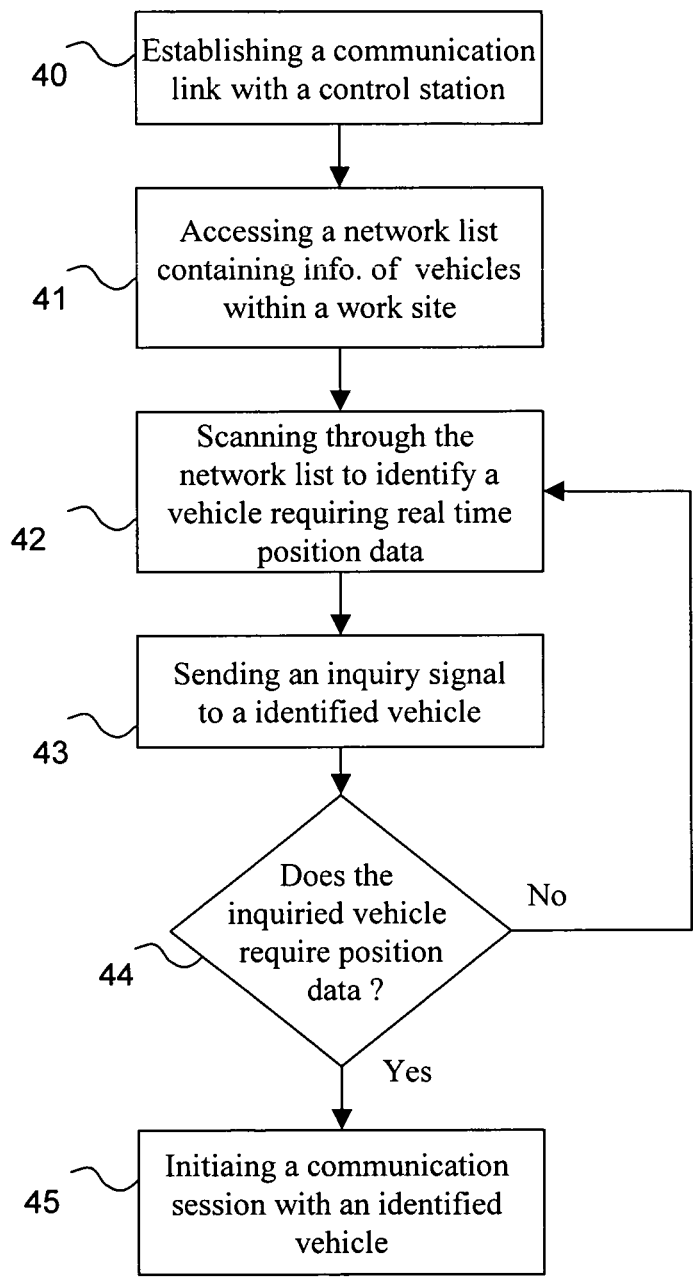
FIG. 4 is a flow chart of another embodiment of the method according to the present invention.

With reference to FIG. 4, a further embodiment of the present invention will be discussed. First, at step 40, a communication link between a total station 2 and a control station 12 is established. Then, at step 41, a total station 2 accesses a network list containing information regarding a number of vehicles 7 within a operating or communicating range of the total station in order to identify a vehicle of the storage unit or memory 13 of the control station 12. The total station 2 may establish the communication link and access the network list when the total station 2 receives an idle message informing the total station 2 that a communication session between a vehicle 7 and the total station 2 has been terminated and/or when a communication link with a vehicle 2 has been lost.

Thereafter, at step 42, a search or scan is performed in the network list to find a vehicle requiring position data. Then, at step 43, an inquiry signal is sent to a first identified vehicle 7 of the network list, as discussed above, there are different procedures for scanning the network list. The inquiry signal comprises an inquiry whether the identified vehicle 7 requires position information. At step 44, it is checked whether a received response signal includes a verification that the particular vehicle 7 requires position data. If yes, the algorithm proceeds to step 45 where the total station 2 starts tracking the vehicle 7 and a radio communication session with the vehicle 7 is initiated during which the vehicle is provided with real time position data. On the other hand, if no, the algorithm returns to step 42, where the search in the network list is continued and an inquiry signal is sent to the next identified vehicle 7 of the network list.

The network list of a total station can be updated, e.g. adding or deleting a vehicle from the list, by accessing a central control station or address server or by a vehicle distributing an updated list to the total station.

Although an exemplary embodiment of the present invention has been shown and described, it will be apparent to those having ordinary skill in the art that a number of changes, modifications, or alterations to the inventions as described herein may be made. Thus, it is to be understood that the above description of the invention and the accompanying drawings is to be regarded as a non-limiting example thereof and that the scope of protection is defined by the appended patent claims.

The invention claimed is:

1. A method for communication between at least one vehicle and at least one total station at a work site, each including a radio communication unit and a control unit, said total station further comprising a position calculating unit adapted to calculate position data including at least horizontal and vertical angle and distance between said total station and at least one target arranged on said vehicle and said total station being adapted to send said position data to said vehicle during a radio communication session, said method comprising the steps of:

using the control unit of a vehicle entering a communication range of the at least one total station and in need of position data to send out an inquiry signal to the at least one total station;

using the control unit of the at least one total station to update a networks list of the at the at least one total station containing only information of radio channels used by vehicles within a communication range of said total station, wherein said update is initiated upon receiving the inquiry signal from the vehicle entering a communication range and in need of position data;

access said network list comprising the information to identify vehicles within said site;

identify at least one vehicle requiring position data using said network list;

start tracking said vehicle to obtain position data of a position of said vehicle; and initiate a radio communication session with said at least one identified vehicle during which said vehicle is provided with real time position data.

2. The method according to claim 1, wherein said step of initiating a communication session comprises the steps of:

using the control unit of the at least one total station to send an inquiry signal to said identified vehicle including an inquiry whether said vehicle requires position data; and check whether an inquired vehicle requires position data; and if said inquired vehicle is found to require position data, initiate said communication session.

3. The method according to claim 1, further comprising:
using the control unit of the at least one total station to
search said list in accordance with a predetermined order;
send an inquiry message to each vehicle communicating over a radio channel in said network list, respectively, in accordance with said order, said inquiry message comprising an inquiry whether said vehicle requires position data;
check whether an inquired vehicle requires position data; and
if said inquired vehicle requires position data, initiate said communication session with said vehicle.

4. The method according to claim 1, wherein said network list is stored in a memory circuit of said total station.

5. The method according to claim 1, wherein said system further comprises a central control station including a storage unit, said network list being stored in said storage unit, wherein said method further comprises the steps of:
using the control unit of the at least one total station to
establish a communication link between a total station and said control station;
access said network list stored in said storage unit of said control station;
perform a search in said network list to find a vehicle requiring position data; and
initialize a radio communication session with an identified vehicle during which said vehicle is provided with real time position data.

6. The method according to claim 1, wherein said vehicles of said network list are ordered in accordance with a predetermined priority order.

7. The method according to claim 1, further comprising the step of:
at an installation of a total station, using the control unit of the at least one total station to update a network list of said total station.

8. The method according to claim 1, further comprising the step of:
using the control unit of the at least one total station to update a network list of said total station via a vehicle connected to said total station.

9. The method according to claim 1, wherein said step of accessing a network list comprises the step of:
using the control unit of the at least one total station to access said network list when said total station receives an idle message informing said total station that a communication session between a vehicle and said total station has been terminated and/or a communication link has been lost.

10. The method according to claim 1, wherein said step of accessing a network list comprises the step of:
using the control unit of the at least one total station to access said network list if said total station has lost the connection with a vehicle in a communication session during a predetermined period of time.

11. A system at least comprising at least one total station, including a radio communication unit and a control unit, and target adapted to be arranged on a vehicle at a work site, said total station further comprising a position calculating unit adapted to calculate position data including at least horizontal and vertical angle and distance between said total station and said target arranged on said vehicle and said total station being adapted to send said position data to said vehicle during a radio communication session, said control unit of said total station being adapted to:
update a networks list of the at least one total station containing only information of radio channels used by vehicles within a communication range of said total station, wherein said update is initiated upon receiving an inquiry signal from a vehicle entering a communication range of the at least one total work station and in need of position data;
access the network list comprising the information to identify vehicles within said site;
identify at least one vehicle requiring position data using said network list;
start tracking said vehicle to obtain position data of said vehicle; and
initiate a radio communication session with said at least one identified vehicle during which said vehicle is provided with real time position data using said communication unit of said total station.

12. The system according to claim 11, wherein said list comprises information of at least one radio channel over which a vehicle within a communication range of said total station communicates.

13. The system according to claim 11, wherein said control unit of said total station is, in order to initiate a communication session, adapted to:
send an inquiry signal to said identified vehicle including an inquiry whether said vehicle requires position data;
check whether an inquired vehicle requires position data;
if said inquired vehicle is found to require position data, initiate said communication session.

14. The system according to claim 11, said control unit of said total station is adapted to:
search said network list in accordance with a predetermined order;
send an inquiry message to each vehicle communicating over a radio channel in said network list, respectively, in accordance with said order, said inquiry message comprising an inquiry whether said vehicle requires position data;
check whether an inquired vehicle requires position data; and
if said inquired vehicle requires position data, initiate said communication session with said vehicle.

15. The system according to claim 11, wherein said network list is stored in a memory circuit of said total station.

16. The system according to claim 11, wherein said system further comprises a central control station including a storage unit, said network list being stored in said storage unit, wherein said control unit of said total station is adapted to:
establish a communication link between said total station and said control station;
access said network list stored in said storage unit of said control station;
perform a search in said network list to find a vehicle requiring position data; and
initiate a radio communication session with an identified vehicle during which said vehicle is provided with real time position data.

17. The system according to claim 11, wherein said vehicles of said network list is ordered in accordance with a predetermined priority order.

18. The system according to claim 11, wherein a network list of a total station is updated at an installation of said total station.

19. The system according to claim 11, wherein a network list stored in a memory circuit of said total station is updated via a vehicle connected to said total station.

20. The system according to claim 11, wherein said control unit of said total station is adapted to:

access said network list when said total station receives an idle message informing said total station that a communication session between a vehicle and said total station has been terminated and/or a communication link has been lost.

21. The system according to claim 11, wherein said control unit of said total station is adapted to:
access said network list if said total station has lost the connection with a vehicle in a communication session during a predetermined period of time.

22. A total station for use at a work site including a radio communication unit and a control unit, said total station further comprising a position calculating unit adapted to calculate position data including at least horizontal and vertical angle and distance between said total station and at least one target arranged on a vehicle and said total station being adapted to send said position data to said vehicle during a radio communication session, said control unit of said total station being adapted to:
update a networks list of the at least one total station containing information of only radio channels used by vehicles within a communication range of said total station, wherein said update is initiated upon receiving an inquiry signal from a vehicle entering a communication range of the at least one total station and in need of position data;
access the network list comprising the information to identify vehicles within said site;
identify at least one vehicle requiring position data using said network list;
start tracking said vehicle to obtain position data of said vehicle; and
initiate a radio communication session with said at least one identified vehicle during which said vehicle is provided with real time position data using said communication unit of said total station.

23. The total station according to claim 22, wherein said control unit of said total station is, in order to initiate a communication session, adapted to:
send an inquiry signal to said identified vehicle including an inquiry whether said vehicle requires position data;
check whether an inquired vehicle requires position data; and
if said inquired vehicle is found to require position data, initiate said communication session.

24. The total station according to claim 22, said control unit of said total station is adapted to:
search said network list in accordance with a predetermined order;
send an inquiry message to each vehicle communicating over a radio channel in said network list, respectively, in accordance with said order, said inquiry message comprising an inquiry whether said vehicle requires position data;
check whether an inquired vehicle requires position data; and
if said inquired vehicle requires position data, initiate said communication session with said vehicle.

25. The total station according to claim 22, wherein said network list is stored in a memory circuit of said total station.

26. The total station according to claim 22,
wherein said network list is stored in a storage unit of a central control station,
wherein said control unit of said total station is adapted to:
establish a communication link between said total station and said control station;
access said network list stored in said storage unit of said control station;
perform a search in said network list to find a vehicle requiring position data; and
initiate a radio communication session with an identified vehicle during which said vehicle is provided with real time position data.

27. The total station according to claim 22, wherein said vehicles of said network list is ordered in accordance with a predetermined priority order.

28. The total station according to claim 22, wherein a network list of a total station is updated at an installation of said total station.

29. The total station according to claim 22, wherein a network list stored in a memory circuit of said total station is updated via a vehicle connected to said total station.

30. The total station according to claims 22, wherein said control unit of said total station is adapted to:
access said network list when said total station receives an idle message informing said total station that a communication session between a vehicle and said total station has been terminated and/or a communication link has been lost.

31. The total station according to claims 22, wherein said control unit of said total station is adapted to:
access said network list if said total station has lost the connection with a vehicle in a communication session during a predetermined period of time.

* * * * *